June 13, 1961 J. P. FERRIS 2,987,866
SPRING TOOTH ASSEMBLY FOR POWER DRIVEN LAWN RAKES
Filed March 16, 1959
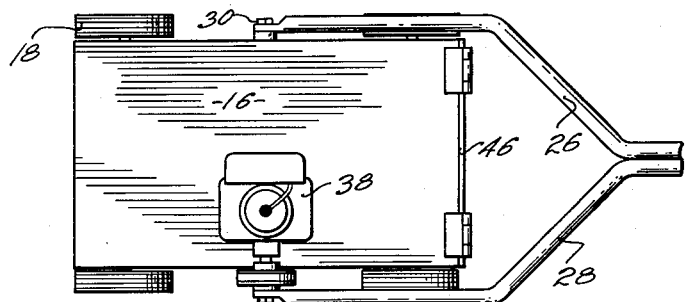
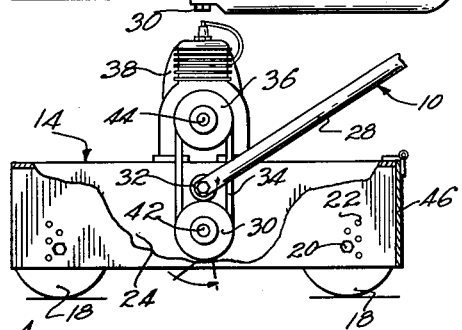
INVENTOR.
John P. Ferris
BY
ATTORNEY United States Patent Office 2,987,866
Patented June 13, 1961

2,987,866
SPRING TOOTH ASSEMBLY FOR POWER
DRIVEN LAWN RAKES
John P. Ferris, Lincoln, Nebr.
(501 Ohio St., Oshkosh, Wis.)
Filed Mar. 16, 1959, Ser. No. 799,655
4 Claims. (Cl. 56—27)

This invention relates to power operated lawn cleaning equipment and particularly, to an improved spring tine assembly for picking up loose grass and other materials such as leaves from the grass as the power operated raking device is advanced across the lawn.

Lawn raking devices of various types have previously been provided and utilizing a rotatable shaft having a series of radially extending teeth thereon which pass through the grass of the lawn, but these prior raking mechanisms have not been entirely satisfactory because of the relatively short useful life of the tooth assembly and the tendency of the teeth thereof to become bent and to break off when relatively immovable objects are struck during operation of the machine. Thus, frequent replacement of the teeth was required and uneven raking of the yard resulted because of misalignment and bending of the teeth by virtue of the same striking obstructions as the power driven rake was advanced.

It is therefore the primary object of the instant invention to provide a novel spring tine assembly for power driven lawn rakes, wherein the tines have a much longer useful life than prior components of this character and which also more efficiently picks up dead grass, leaves and other debris from within the blades of grass and raises the same to the upper parts thereof as the machine is moved over the yard.

It is a further important object of the invention to provide a novel spring tine assembly as referred to above having a plurality of individual tines removably secured to a rotatable member mounted on the housing of the rake for rotation on a horizontal axis and with each of the tines including a coiled portion for permitting the grass and ground-engaging extremities of the tines to shift relative to the rotatable member as the coiled portions flex and furthermore, including novel means for damping the recoil of the outer extremities of each of the tines, thus also serving to increase the longevity of the same.

It is an additional important aim of the invention to provide a spring tine assembly for power driven lawn rakes wherein the individual tines are removably secured to the horizontally rotatable member with the coiled portions in proximity thereto, and retainer means being provided for restricting movement of the coiled portions of the tines longitudinally of the rotatable member to prevent misalignment of the grass and ground-engaging, substantially rectilinear stretches of the tines.

An important object is also to provide improved means for securing the individual tines to the rotatable member whereby the same may be quickly and easily removed for repair or replacement as required.

Other important objects and details of construction of the present invention will be explained in greater detail or become apparent as the following specification progresses.

In the drawing:
FIGURE 1 is a plan view of a power driven rake adapted to receive a spring tine assembly constituting the subject matter of the instant invention;

FIG. 2 is a fragmentary, side elevational view of the lawn rake shown in FIG. 1, with certain parts thereof being broken away to reveal details of construction therebehind;

FIG. 3 is a fragmentary, enlarged, partial front elevational view of the spring tine assembly having the features of the present invention embodied therein and with portions of the assembly being shown in vertical cross-section to more clearly illustrate the details thereof;

FIG. 4 is an enlarged, vertical, cross-sectional view taken substantially on the line 4—4 of FIG. 3 and looking in the direction of the arrows; and FIG. 5 is a fragmentary, front elevational view of a modified form of the spring tine assembly.

A lawn rake broadly designated by the numeral 10 and adapted for mounting a spring tine assembly 12 embodying the concepts of the instant invention, preferably comprises a substantially U-shaped housing 14, open at the bottom and opposed ends thereof and normally presenting a substantially horizontal, rectangular top section 16.

Wheels 18 rotatably mounted at respective corners of housing 14 are rotatable on parallel horizontal axes with the shafts 20 thereof being positionable in any one of a number of openings 22 in the side walls 24 of housing 14 and thereby permitting the relative height of housing 14 with respect to the ground to be changed.

A pair of longitudinally bent elements 26 and 28 present a substantially Y-shaped handle with the normally lowermost ends of elements 26 and 28 pivotally secured to the outer faces of opposed side walls 24, as illustrated in FIGS. 1 and 2. Bolt means 30 pivotally connecting respective ends of elements 26 and 28 to side walls 24 permit the handle to swing about a substantially horizontal axis, while a sleeve 32 interposed between the lower end of element 28 and the proximal side wall 24 and surrounding bolt means 30 connecting element 28 to housing 14, maintains the lower end of element 28 in sufficiently spaced relationship to the adjacent side wall 24 to clear a V-belt 34 trained around the pulley 36 of internal combustion engine 38 and a pulley 40 on the outer end of shaft 42 extending through both of the side walls 24 of housing 14 and thereby carried by suitable bearing means (not shown). Engine 38, mounted on the upper surface of top section 16 adjacent one of the side walls 24, is disposed with the output shaft 44 thereof and rotatably carrying pulley 36 therewith, extending outwardly over the proximal longitudinal edge of top section 16.

A rectangular flap 46 is preferably hingedly secured to the rearmost edge of housing 16 in transversely extending relationship to top section 16 and of a height substantially equal to side walls 24. Flap 46 may be constructed of various materials such as metal, fabric or rubber.

Driven shaft 42 coupled to pulley 40 and constituting a part of assembly 12, mounts a cylindrical member 48 surrounding shaft 42 within housing 14 and maintained in coaxial relationship thereto by perforated end plates 47 welded to corresponding ends of tubular member 48 and shaft 42 respectively. It is preferred that member 48 be substantially circular in transverse section and therefore, end plates 47 are also of circular configuration, complementally fitted within respective ends of tubular member 48 and provided with central openings therein receiving shaft 42.

A plurality of pick-up tines broadly enumerated 52 are removably secured to the outer surface of member 48 in longitudinally spaced, radially extending relationship.

Since the construction of pick-up tines 52 as well as the means for releasably securing the same to member 48 are substantially identical in character, only one of such pick-up tines will be described in detail.

Each pick-up tine 52 includes a substantially rectilinear outer stretch 54, an intermediate coiled portion 56 integral with one extremity of stretch 54, and a substantially L-shaped extension 58 provided with a relatively straight inner leg 60 integral with the end of coiled portion 56 remote from stretch 54. The relatively short outer leg 62 of extension 58 and projecting laterally from inner leg 60 in a direction away from coiled portion 56 is receivable within a corresponding opening 64 provided therefor in member 48.

A clamping block 66 releasably secures each pick-up tine 52 to a corresponding outer face of member 48 and is substantially rectangular in configuration, positioned longitudinally of member 48 and provided with a transversely extending groove 68 therein complementally receiving a respective inner leg 60 of pick-up tine 52. Stud bolts 70 passing through the extremities of clamping blocks 66 remote from corresponding inner legs 60 of pick-up tines 52 and threaded into respective rectangular segments of member 48, releasably secure pick-up tines 52 to rotatable member 48 yet permit rapid removal and replacement of pick-up tines 52 as required. It is to be noted that the areas of each of the tines 52 serving to define the zone of juncture of stretches 54 with coiled portions 56 are in abutting relationship to the outer surface of member 48.

In operation, it is to be understood that engine 38 is started and then rake 10 is advanced forwardly over the lawn to be raked by pushing on the Y-shaped handle defined by elements 26 and 28. During operation of engine 38, shaft 42 is rotated in a counterclockwise direction viewing FIG. 2, by virtue of V-belt 34 operably interconnecting pulley 36 on output shaft 44 of engine 38 and pulley 40 on shaft 42. The direction of rotation of member 48, the same as the normal direction of forward movement of the lawn rake, facilitates pushing of the machine.

Member 48 is also rotated in response to turning of shaft 42, whereby rectilinear stretches 54 of tines 52 are caused to move through the blades of grass to pick up leaves, dead grass and other debris matted in the lawn.

It can be appreciated that the extent to which rectilinear stretches 54 of tines 52 pass downwardly into the grass is dependent upon the position of wheels 18 relative to opposed side walls 24 of housing 14. As previously indicated, the height of shaft 42 may be changed by varying the position of wheel-carrying shafts 20 in respective openings 22.

As rectilinear stretches 54 of tines 52 pass through the blades of grass at a relatively high speed, the loose material is laid down on the top of the grass as a mat.

The way in which pick-up tines 52 are removably secured to member 48 with the segments of stretches 54 adjacent coiled portions 56 normally complementally abutting corresponding outer surface areas of tubular member 48 is a particularly important feature of the invention. When the outer ends of stretches 54 strike objects during rotation of assembly 12, the segments of tines 52 engaging member 48 provide greater support for the pick-up tines to assure proper lifting of grass and leaves or the like from within the blades of grass comprising the lawn. In this respect, it is to be understood that tines 52 are preferably constructed of spring steel material to thereby assure that the rectilinear stretches 54 thereof are resilient and return to their original configuration after being flexed by striking relatively immovable objects or the like. Coiled portions 56 of each of the tines 52 also increase the resiliency of the teeth by virtue of partial uncoiling of each tine 52 when the same strikes an object or retarding material such as matted grass and leaves.

Disposition of the segments of stretches 54 of tines 52 in complementally abutting relationship to member 48 also has the advantage of deadening or damping the recoil of each of the rectilinear stretches 54 after the same is released from the relatively immovable object or matted grass, and materially increasing the longevity of tines 52.

It has also been determined that four courses of spiral tines 52 arranged in substantially spiral configuration longitudinally of tubular member 48 produce the best results with the least shock during raking of a lawn or the like.

In the modified spring tine assembly construction shown in FIG. 5, means are provided for limiting movement of coiled portions 56 of pick-up tines 52 as well as rectilinear stretches 54 thereof longitudinally of member 48 and thereby shaft 42 and comprises a retainer 72 for each pick-up tine 52 respectively. Each retainer 72 has a relatively straight end section 74 directly overlying a corresponding clamping block 66, in longitudinal alignment therewith and retained in place on the same by corresponding stud bolts 70 passing through the end section 74 as well as clamping block 66 disposed directly therebeneath. A longitudinally arcuate length 76 of each retainer 72 and integral with the end section 74 thereof, extends through the central portion of a proximal coiled portion 56 of pick-up tines 52 with the outermost end of each of the lengths interposed between the proximal extremity of the next adjacent clamping block 66 as well as the proximal coil of coiled portion 56 of pick-up tines 52. Likewise, the part of each length 76 integral with a corresponding end section 74 substantially abuts the proximal coil of coiled portion 56 of the defined pick-up tine 52 whereby retainers 72 limit movement of pick-up tines 52 longitudinally of member 48.

The provision of retainers 72 for limiting movement of tines 52 longitudinally of member 48 has been found to be important in order that uniform raking is obtained, notwithstanding the rectilinear stretches 54 of tines 52 striking objects and engaging matted grass during operation of rake 10.

Having thus described the invention what is claimed as new and desired to be secured by Letters Patent is:

1. In a power driven lawn raker provided with a hollow, open bottom, mobile housing, an elongated member having a cylindrical, outer surface and rotatably mounted within the housing for rotation on a substantially horizontal axis; means adapted to be carried by the housing and operably coupled with said member for rotating the latter in one direction; a plurality of flexible pick-up tines each having an elongated stretch at one extremity thereof and a coiled portion at the opposite extremity thereof integral with a respective stretch at a zone of juncture on the periphery of the coiled portion; and a clamp for each tine securing the latter to the outer surface of said member, said clamp being removably connected to said member with one face of said clamp in engagement with said surface and provided with a groove in the face threof complementally receiving a segment of a revolution of the coiled portion remote from said zone to mount said tine with the zone of juncture thereof in engagement with the outer surface of said member, whereby the stretch of said tine is substantially tangential to the latter and movable into engagement therewith when said stretch engages an object tending to impede the movement thereof with the member.

2. A power driven lawn raker as set forth in claim 1, wherein said tines each have a substantially L-shaped extension thereon including an inner leg integral with a corresponding coiled portion of the tines and an outer, laterally extending leg integral with the respective inner leg, said member having a series of openings therein receiving respective outer legs of the extensions and the grooves of said clamps receiving the respective inner legs therein to secure the tines to the member.

3. A power driven lawn raker as set forth in claim 1, wherein each of said clamps is provided with an arcuate length extending through a corresponding coiled portion and engageable with the latter proximal to said zone of juncture of the tine to limit movement of said coiled portion longitudinally of the member.

4. A power driven lawn raker as set forth in claim 1, wherein said tines are disposed in spiral relationship longitudinally of the member.

References Cited in the file of this patent

UNITED STATES PATENTS

| | | |
|---|---|---|
| 2,482,883 | Thomas | Sept. 27, 1949 |
| 2,657,408 | Machovec | Nov. 3, 1953 |
| 2,714,796 | Haupt et al. | Aug. 9, 1955 |
| 2,723,494 | Parker et al. | Nov. 15, 1955 |